United States Patent [19]

Peterson et al.

[11] 4,157,043

[45] Jun. 5, 1979

[54] MAXIMUM PRESSURE MANOMETER

[75] Inventors: James J. Peterson, Palatine; James P. Cianci, Cary, both of Ill.

[73] Assignee: The Kendall Company, Boston, Mass.

[21] Appl. No.: 885,835

[22] Filed: Mar. 13, 1978

[51] Int. Cl.$^2$ .................................. G01L 7/18
[52] U.S. Cl. ........................... 73/709; 73/747
[58] Field of Search .............. 73/709, 747, 700; 128/2.05 D

[56] References Cited

U.S. PATENT DOCUMENTS

| | | | |
|---|---|---|---|
| 3,715,925 | 2/1973 | Miller | 73/709 |
| 3,730,168 | 5/1973 | McWhorter | 73/747 |
| 3,977,253 | 8/1976 | Lewis | 73/747 |

*Primary Examiner*—Donald O. Woodiel
*Attorney, Agent, or Firm*—Powell L. Sprunger

[57] ABSTRACT

A manometer for recording maximum pressures from a liquid supply comprising, a closed air chamber, an elongated channel communicating with the supply adjacent a lower end of the channel and communicating with the chamber through an opening adjacent an upper end of the channel, and an overflow cavity positioned to receive and collect liquid passing through the channel and opening such that the quantity of liquid collected in the cavity provides an indication of the maximum pressure achieved by the supply.

14 Claims, 6 Drawing Figures

U.S. Patent  Jun. 5, 1979  4,157,043
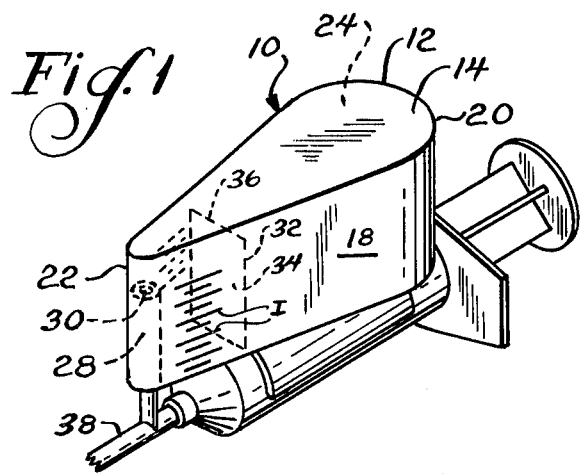
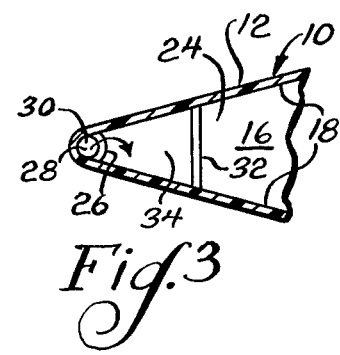
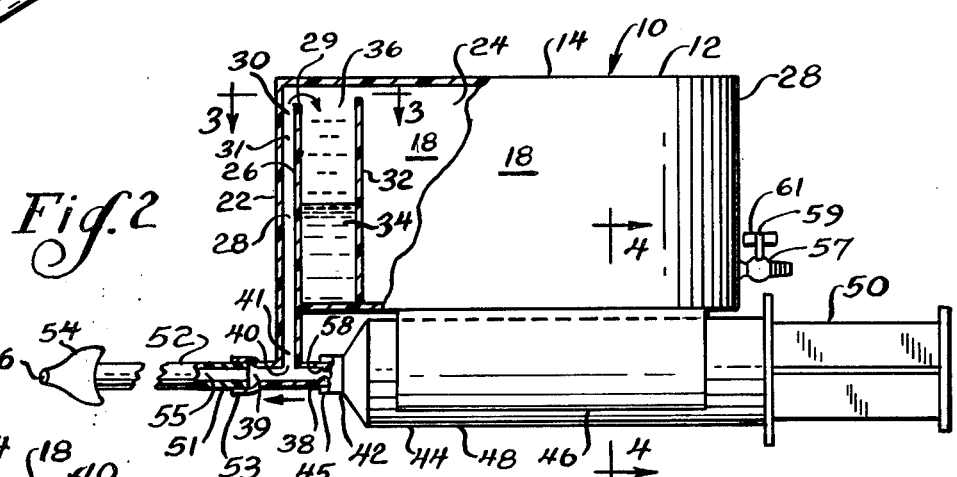
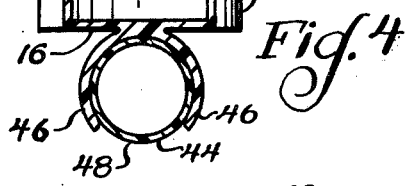
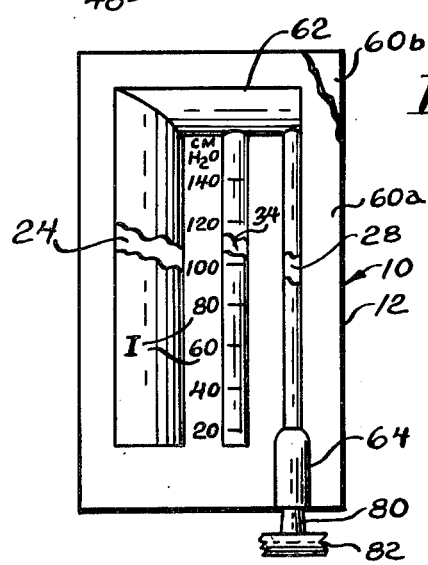
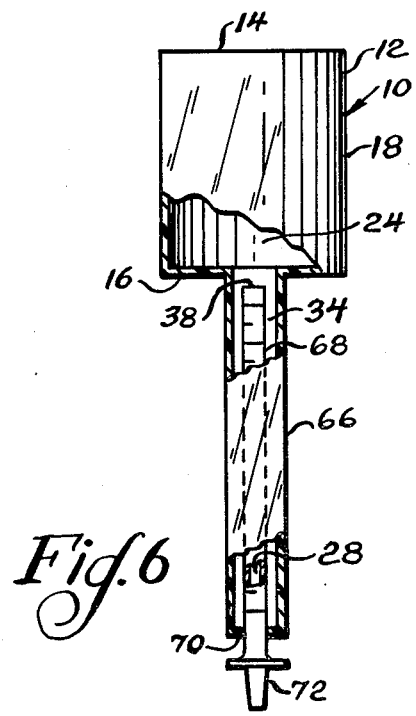

MAXIMUM PRESSURE MANOMETER

BACKGROUND OF THE INVENTION

The present invention relates to pressure measuring devices, and more particularly to manometers.

A various assortment of manometers have been proposed for use in continuously measuring liquid pressures. In certain instances, it may be desirable to measure the maximum liquid pressure achieved over a specified time or during a particular test. Since the measured liquid pressures may continually fluctuate, conventional manometers of this sort require constant attention by the user if attempts are made to determine the maximum liquid pressure, and, in spite of great care, such a determination may be suspect from a viewpoint of accuracy. On the other hand, prior devices designed to record maximum pressures have suffered from an incapability of measuring relatively low pressures, or have been excessively complicated and expensive in structure such that they are impractical for disposable use.

SUMMARY OF THE INVENTION

A principal feature of the present invention is the provision of a manometer of simplified construction for recording maximum pressures from a liquid supply.

The manometer of the present invention comprises, a closed air chamber, an elongated channel communicating with the supply adjacent a lower end of the channel and communicating with the chamber through an opening adjacent an upper end of the channel, and an overflow cavity positioned to receive liquid passing through the channel and opening.

A feature of the present invention is that the liquid passes into the manometer channel from the supply while the air in the cavity and chamber is compressed by the liquid.

Another feature of the invention is that when the liquid pressure becomes sufficiently high, the liquid passes through the channel and opening into the cavity for collection therein.

Still another feature of the invention is that the volume of liquid collected in the cavity provides an indication of the maximum liquid pressure.

Thus, a further feature of the invention is that the manometer may be utilized to record maximum liquid pressures.

A feature of the invention is that the manometer has the capability of measuring relatively low pressures.

Another feature of the invention is that the manometer may be constructed in a simplified and inexpensive manner such that it is suitable for disposable use.

Yet another feature of the invention is that the manometer may be utilized to determine the amount of external pressure which is required to open the urethral external sphincter of the lower urinary tract.

Further features will become more fully apparent in the following description of the embodiments of this invention and from the appended claims.

DESCRIPTION OF THE DRAWINGS

In the drawings:

FIG. 1 is a perspective view of the manometer of the present invention;

FIG. 2 is an elevational view, taken partly in section, of the manometer of FIG. 1;

FIG. 3 is a fragmentary sectional view taken substantially as indicated along the line 3—3 of FIG. 2;

FIG. 4 is a fragmentary sectional view taken substantially as indicated along the line 4—4 of FIG. 2;

FIG. 5 is an elevational view, partly broken away, of another embodiment of the manometer of the present invention; and FIG. 6 is an elevational view, taken partly in section, of another embodiment of the manometer of the present invention.

DESCRIPTION OF THE PREFERRED EMBODIMENTS

Referring now to FIGS. 1-4, there is shown a manometer generally designated 10 having a housing 12. The housing 12 has a top wall 14, a bottom wall 16, and a side wall 18 extending peripherally around the housing, with the housing being tapered from a proximal end 20 toward a distal end 22 of the housing.

As shown, the housing 12 defines an enlarged chamber 24 which extends from the proximal end 20 toward the distal end 22 of the housing. The housing 12 also has a first inner wall 26 defining an elongated upright channel 28, with the upper end 29 of the first wall 26 being spaced from the top wall 14 and defining an opening 30 adjacent an upper end 31 of the channel 28, such that the channel 28 communicates with the chamber 24 through the opening 30. The housing 12 has a second inner wall 32 extending between opposed portions of the side wall 18 at a location intermediate the first wall 26 and the proximal end 20 of the housing. As shown, the second wall 32 is spaced from the top housing wall 14 and defines a cavity 34 in the housing located intermediate the channel 28 and chamber 24, with the cavity 34 being located below the upper channel opening 30 and communicating through an upper opening 36 with the channel 28 and chamber 24. The manometer 10 may also have a conduit or tubular section 38 defining a passageway 39 which communicates with the channel 28 through an opening 40 adjacent a lower end 41 of the channel 28. As shown in FIG. 1, the housing 12 may have a plurality of vertically disposed indicia I on the portion of the side wall 18 which defines the outside of the cavity 34.

With reference to FIGS. 1-4, the tip 42 of a syringe 44 may be connected to the proximal end 45 of the tubular section 38, and the housing 12 may have a pair of opposed depending clips 46 to releasably receive a barrel 48 of the syringe 44 and retain the syringe in place while connected to the tubular section 38. The syringe may be of conventional type, and may have a plunger 50 received in the syringe barrel 48 for pumping liquid out of the barrel. As shown in FIG. 2, the device may include a conduit 52 which has a proximal end 51 connected to a distal end 53 of the tubular section 38, and which has a lumen 55 defining a continuation of the passageway 39. The conduit 53 may have an enlarged tapered sealing member 54 adjacent a distal end of the conduit, with the sealing member 54 defining an orifice 56 at the distal end of the sealing member communicating with the lumen 55. The sealing member may be made of any suitable soft, pliable material, such as rubber, or may comprise an inflatable balloon.

In use, the plunger 50 of the syringe 44 may be pushed into the barrel 48 in order to pump liquid out of the syringe into the passageway 39. As the liquid pressure increases in the passageway 39, the liquid passes from the passageway 39 through the opening 40 into the upright channel 28. If desired, the tubular section may have an internal ring 58 located upstream from the opening 40 in order to limit and control the passage of liquid from the syringe, and minimize any effect which the velocity of liquid may have upon the pressure measurements as the liquid rushes into the channel 28. As the liquid rises in the channel 28, the weight of the liquid column in the channel 28 provides resistance against upward movement of the liquid. Further, the rising liquid column in the channel 28 compresses air in the cavity 34 and chamber 24, and the compressed air also restrains motion of the liquid in the channel 28. However, when the liquid pressure in passageway 39 becomes sufficiently large, the liquid passes through the upper channel opening 30 and overflows into the cavity 34 where it is collected. It will be apparent that the quantity of liquid which passes into the cavity 34 is related to the magnitude of liquid pressure in the passageway 39. In this regard, it is noted that the liquid which collects in the cavity 34 displaces air in the cavity, and increases the pressure of the compressed air in the remaining portion of the cavity and in the chamber 24. Thus, the collected liquid compresses the confined air and increases the resistance against motion of liquid into the channel 28. As the liquid pressure in the passageway 39 abates and/or the pressure of the compressed air sufficiently increases, the quantity of liquid passing from the channel 28 into the cavity 34 diminishes, until passage of liquid into the cavity eventually ceases. At this time, the height of collected liquid in the cavity 34 may be compared against the indicia I which are suitably calibrated to provide an indication of the maximum liquid pressure achieved in the passageway 39. Thus, the volume of at least the lower part of the cavity is substantially less than the volume of the chamber such that the height of liquid in the cavity is modified by a relatively small amount of collected liquid in order to obtain a relatively accurate determination of maximum pressure by the calibrated indicia I vertically disposed along the cavity.

Thus, in accordance with the present invention, the manometer may be utilized in a convenient and simplified manner to determine the maximum pressure in a liquid system. The manometer may be made of any suitable material, such as a plastic, and may be constructed in an inexpensive manner, such that it is suitable for disposable use. Further, the manometer of the invention is capable of measuring relatively low pressures, such as 5 to 50 cms. of water. If desired, the housing 12 may have a valve 57 with a rotatable valve element 59 and associated handle 61 for selectively draining the collected liquid from the housing and returning the chamber to atmospheric pressure in order to condition the manometer for subsequent use.

According to another aspect of the present invention, the conduit 52 and the manometer 10 may be utilized to measure the amount of externally applied pressure that is required to open the urethral external sphincter of the lower urinary tract. After prepping the meatal area in the usual manner, the sealing member or urethral tip 54 is placed into the meatal opening to form a fluid-tight pathway from the syringe to the urethra. The infusion medium, such as water, is then ejected from the syringe into the urethra at a constant rate which may be controlled by the ring 58 in the passageway 39. Since the system is closed distally by the contracted urethral sphincter and proximally by the device, the pressure in the system gradually increases as liquid is pumped from the syringe. However, when the pressure due to the instilled liquid exceeds the sphincter closure pressure, the sphincter opens and the pressure in the system immediately drops. In the meantime, the manometer records the maximum liquid pressure required to open the external sphincter during the procedure. Such a measurement is useful for the following purposes: (a) as a screening procedure for lower urinary tract neurogenic dysfunctions; (b) as a pre- and post-operative procedure for evaluation of surgical intervention; and (c) in serial patient studies to follow and quantitate the history and course of a particular patient's disease.

Another embodiment of the present invention is illustrated in FIG. 5, in which like reference numerals designate like parts. In this embodiment, the manometer 10 has front and back plates 60a and 60b of a suitable material, such as plastic, which may be formed to define an upright elongated chamber 24, an upright cavity 34, and an elongated upright channel 28. The plates 60a and b are sealed together around the periphery of the plates and intermediate the cavity 34 and both the chamber 24 and channel 28. As shown, the upper end of the channel 28 and cavity 34 may be connected to the chamber 24 by an upper extension 62 of the chamber 24. The plates 60a and b may also have a suitable enlargement 64 in order to connect the manometer to a suitable device, such as an adapter 80 of a tube 82 containing a supply of liquid. The manometer of FIG. 5 operates in a manner similar to that previously described in connection with the manometer of FIGS. 1–4. As the liquid flows into the channel 28, the air in the chamber 24 is compressed and resists passage of liquid into the channel. However, when the liquid pressure becomes sufficiently large, the liquid passes from the channel 28 into the cavity 34 where it collects to provide an indication of maximum pressure as determined by comparing the height of collected liquid against the calibrated indicia I. It will be apparent that the manometer of FIG. 5 may be constructed in a very inexpensive manner, since the plates 60a and b may be molded and sealed together in order to simplify the complexity and cost of manufacture.

Another embodiment of the present invention is illustrated in FIG. 6, in which like reference numerals designate like parts. In this embodiment, the housing has a top wall 14, a bottom wall 16, and a cylindrical side wall 18 defining the chamber 24. The housing 12 also has an elongated cylindrical hollow stem 66 extending from the bottom wall 16 and defining a cavity 34 which communicates with the chamber 24. The manometer 10 also has an elongated tubular section 68 received in the cavity 34 and spaced from the sidewalls of the stem 66. As shown, a lower end of the tubular section 68 is sealed to a lower flange 70 of the stem 66 in order to close the cavity 34. The tubular section 68 defines a channel 28 which communicates through an opening 30 with the chamber 24 and the cavity 34. The tubular section 68 also has a connector 72 at its lower end for attachment of the manometer to a suitable liquid system. As previously discussed in connection with the manometers of FIGS. 1–5, liquid flows into the channel 28 while the air in the chamber 24 and cavity 34 is compressed. When pressure in the liquid system becomes sufficiently large, in this embodiment the liquid flows from the channel 28 through the opening 30 into the lower portion of the cavity 34 intermediate the tubular section 68 and the stem 66. Thus, the volume of liquid collected in the cavity 34 provides an indication of the maximum pressure achieved in the liquid system during use. In a suitable form, the walls of the stem 66 may be transparent, and the stem or tubular section may have calibrated indicia I for determining the maximum pressure attained by the liquid system.

The foregoing detailed description is given for clearness of understanding only, and no unnecessary limitations should be understood therefrom, as modifications will be obvious to those skilled in the art.

We claim:

1. A manometer for recording maximum pressures from a liquid supply comprising, a closed air chamber, an elongated channel communicating with said supply adjacent a lower end of the channel and communicating with the chamber through an opening adjacent an upper end of the channel, and an overflow cavity positioned to receive liquid passing through said channel and opening, with at least a lower cavity portion of substantial height being isolated from the channel and chamber to collect liquid therein without passage into the chamber, and means associated with said cavity lower portion for determining the maximum pressure achieved by the supply relative to the height of liquid collected in the cavity.

2. The manometer of claim 1 wherein said cavity surrounds said channel.

3. The manometer of claim 1 wherein said cavity is located intermediate the channel and chamber.

4. The manometer of claim 1 including a passageway communicating with said channel through an opening adjacent the lower end of the channel, and pump means connected to the passageway proximal said lower channel opening.

5. The manometer of claim 4 including a conduit defining a portion of said passageway distal the lower channel opening, and means for sealingly engaging a patient's body adjacent a distal end of the conduit.

6. The manometer of claim 4 including means for limiting the passage of liquid intermediate the pump means and said lower channel opening.

7. The manometer of claim 1 including valve means for controlling passage of fluid between the manometer and the atmosphere.

8. A manometer for recording maximum pressures from a liquid supply comprising, a housing having sidewalls defining an enlarged air chamber, and an elongated hollow stem extending from said chamber and defining a cavity communicating with said chamber, an elongated tubular section received in said stem and defining a channel communicating with said cavity and chamber through an opening, such that liquid passes through said channel and opening into said cavity intermediate the stem and tubular section for collection therein, means for connecting a lower end of said tubular section and channel to said supply, and means associated with the cavity for determining the maximum pressure achieved by the supply relative to the height of liquid collected in the cavity.

9. A manometer for recording maximum pressures from a liquid supply comprising, front and back plates secured together and shaped to define an enlarged air chamber, a cavity, and a channel, said cavity being generally aligned with the channel intermediate the chamber and channel, said cavity communicating with said chamber and an upper end of the channel adjacent an upper end of the cavity such that liquid passes from the channel into the cavity for collection therein, means for connecting a lower end of said channel to said supply, and means associated with the cavity for determining the maximum pressure achieved by the supply relative to the height of liquid collected in the cavity.

10. A manometer for recording maximum liquid pressures comprising, an elongated housing defining an enlarged air chamber adjacent one end of the housing, an elongated upright channel adjacent the other end of the housing and communicating with the chamber through an opening adjacent an upper end of the channel, an upright cavity intermediate said channel and chamber and communicating with the channel and chamber adjacent an upper end of the cavity, a lower end of said channel communicating with a liquid passageway such that liquid passes through the channel and upper channel opening into the cavity to provide an indication of the maximum liquid pressure achieved in said passageway, and means associated with the cavity for determining the maximum pressure achieved by the supply relative to the height of liquid collected in the cavity.

11. The manometer of claim 10 including pump means for pumping liquid through said passageway.

12. The manometer of claim 11 wherein the pump means comprises a syringe.

13. The manometer of claim 11 wherein said housing includes clip means for releasably attaching the housing to the pump means.

14. A manometer for recording maximum pressures from a liquid supply comprising, a housing defining an elongated upright channel having an upper opening, an overflow cavity located adjacent said channel below said channel opening to collect liquid passing through the channel and said channel opening, and an enlarged air chamber communicating with upper portions of the channel and cavity, with said cavity having a volume substantially less than the volume of said chamber, and means for calibrating said cavity to provide an indication of the maximum pressure relative to the height of liquid collected in the cavity.

* * * * *